(12) United States Patent
Liang et al.

(10) Patent No.: US 8,089,966 B2
(45) Date of Patent: *Jan. 3, 2012

(54) SYSTEM AND METHOD FOR FILTERING A DATA PACKET USING A COMBINED FILTER

(75) Inventors: Victor Liang, Irvine, CA (US); Ashish Singhal, Irvine, CA (US); Fei Xie, Irvine, CA (US); David Ho Suk Chung, Rancho Palos Verdes, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 169 days.

This patent is subject to a terminal disclaimer.

(21) Appl. No.: 12/428,359

(22) Filed: Apr. 22, 2009

(65) Prior Publication Data

US 2010/0272119 A1 Oct. 28, 2010

(51) Int. Cl.
*H04L 12/28* (2006.01)
*H04L 12/56* (2006.01)
(52) U.S. Cl. ......................... 370/392; 370/389
(58) Field of Classification Search .................. 370/389, 370/392
See application file for complete search history.

(56) References Cited

U.S. PATENT DOCUMENTS

| 7,369,554 B1 | 5/2008 | Modelski et al. |
| 7,684,400 B2 | 3/2010 | Govindarajan et al. |
| 7,724,740 B1 | 5/2010 | Wang et al. |
| 7,817,662 B2 | 10/2010 | McDaniel et al. |
| 2002/0106018 A1* | 8/2002 | D'Luna et al. ........... 375/240.01 |
| 2003/0169736 A1 | 9/2003 | Lavigne et al. |
| 2004/0028046 A1 | 2/2004 | Govindarajan et al. |
| 2005/0135351 A1* | 6/2005 | Parmar et al. .................. 370/389 |
| 2006/0143655 A1* | 6/2006 | Ellis et al. ......................... 725/47 |
| 2008/0232359 A1* | 9/2008 | Kim et al. ...................... 370/389 |
| 2009/0109973 A1 | 4/2009 | Ilnicki |
| 2009/0204677 A1 | 8/2009 | Michaelis et al. |
| 2010/0020799 A1 | 1/2010 | Lee et al. |

OTHER PUBLICATIONS

Office Action mailed Dec. 23, 2009 in U.S. Appl. No. 12/180,451.
Notice of Allowance mailed May 27, 2010 in U.S. Appl. No. 12/180,451.
Jelassi et al., "A Two-Level Packet Classification", INT, National Institute of Telecommunication, Evry, France, pp. 1-4, Jul. 6, 2006.
Erman et al., "Traffic Classification Using Clustering Algorithms", University of Calgary, Calgary, AB, Canada, pp. 1-6, Jan. 20, 2005.

(Continued)

*Primary Examiner* — Ayaz Sheikh
*Assistant Examiner* — Tarell Hampton
(74) *Attorney, Agent, or Firm* — Beyer Law Group LLP

(57) ABSTRACT

System and method for filtering a data packet using a combined filter are disclosed. In one aspect, the method includes receiving a data packet and N filters. The method includes receiving a data packet and N (wherein N is an integer and N>1) filters, each filter comprising a bit mask and corresponding bit values. The method further includes, for each of the N filters, identifying a key element from a portion of the filter corresponding to a combined filter, the key element being a segment of the filter portion having the richest bit pattern. The method further includes generating the combined filter by combining the key element of the N filters. The method further includes filtering the data packet with the combined filter to determine whether there is a match between the data packet and each key element.

22 Claims, 6 Drawing Sheets

OTHER PUBLICATIONS

Zander et al., "Self-Learning IP Traffic Classification Based on Statistical Flow Characteristics", Centre for Advanced Internet Architectures, Swinburne University of Technology, Melbourne, Australia, pp. 1-4, Sep. 11-5, 2006.

Office Action mailed Dec. 13, 2010 in U.S. Appl. No. 12/428,375.
Final Office Action mailed Jun. 1, 2011 in U.S. Appl. No. 12/428,375.
Xu et al., "HSM; A Fast Packet Classification Algorithm", 19th International Conference on Mar. 20-30, 2005, pp. 1-8.

* cited by examiner

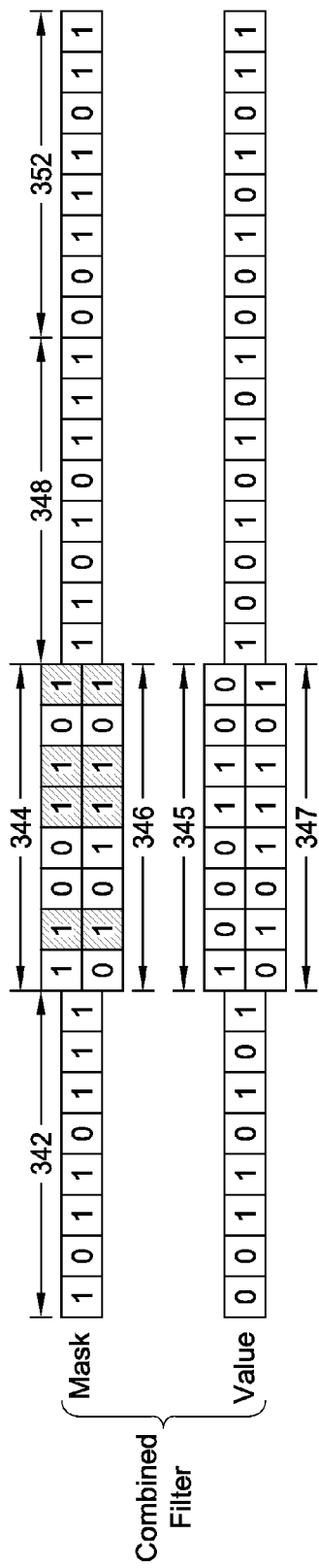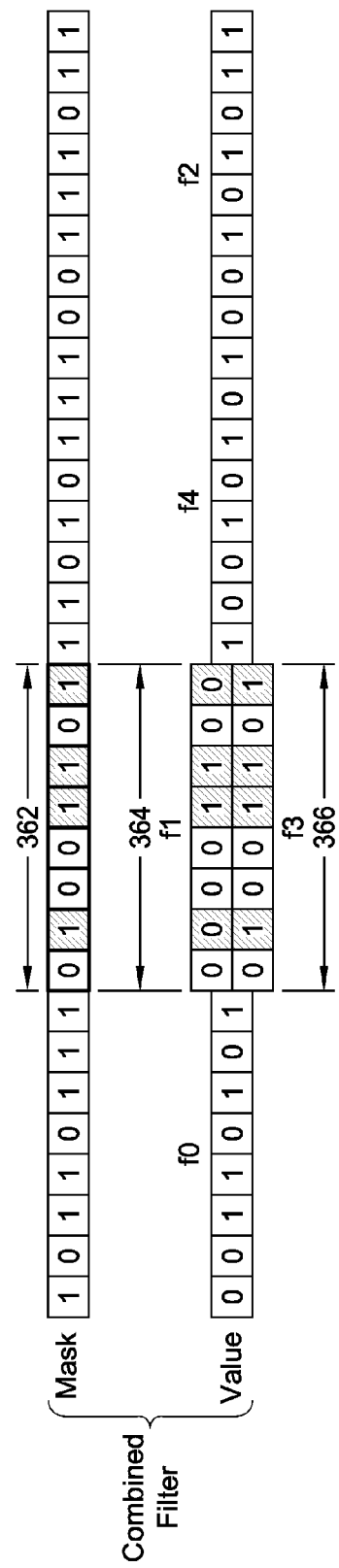

SYSTEM AND METHOD FOR FILTERING A DATA PACKET USING A COMBINED FILTER

CROSS-REFERENCE TO RELATED APPLICATIONS

This application is related to U.S. application Ser No. 12/428,375, filed on the same day herewith and titled "SYSTEM AND METHOD FOR FILTERING A DATA PACKET USING A COMMON FILTER," and U.S. application Ser. No. 12/180,451, filed on Jul. 25, 2008 and titled "METHOD AND SYSTEM FOR DATA FILTERING FOR DATA PACKETS." Each of the above applications is hereby incorporated by reference in its entirety.

BACKGROUND OF THE INVENTION

1. Field of the Invention

The invention relates to a data filtering scheme with multiple filters.

2. Description of the Related Technology

In a cable television system, a cable headend often sends a large amount of network traffic to a set top box (STB). The set top box needs to examine each data packet and find the data patterns matching the data packet for further processing. Different data patterns are provided by the headend with multiple filters, and these patterns can be changed or adjusted by the headend. This makes it difficult to apply existing data filtering algorithms which use fixed data pattern for filtering, such as the data filtering algorithms used in IP packet filtering or IP firewall protection.

Filters in a cable STB exist in the form of a (n×m) matrix, where n and m is the number of rows and columns, respectively. Let fij represents a filter located in i-th row and j-th column in the matrix. All the conditions of each filter in the i-th row (i.e. fi0, fi1, ... fim) must be satisfied when evaluating the filters in the row. In other words, the evaluation of filters in the row uses AND operator. However, OR operator is used for the evaluation of filters in j-th columns (i.e. f0j, fij, ..., fmj)). Traditional data filtering is done "sequentially", that is, full filtering starts with at the 0-th row (i.e. f00, f01, ..., f0m). If 0-th row is not satisfied, then it moves on to the next row until one finds the correct set of filters in a specific row. Typically, a packet is sequentially compared to each filter until a match, or dropped after comparing to the last filter.

The data filtering requires a large amount of processing time and resources. Given that the traditional data filtering scheme is computationally complex, it is desirable to find an improved scheme with reduced computational complexity.

SUMMARY OF CERTAIN INVENTIVE ASPECTS

The system, method, and devices of the invention each have several aspects, no single one of which is solely responsible for its desirable attributes. Without limiting the scope of this invention, its more prominent features will now be briefly discussed.

One aspect relates to a method of filtering a data packet. The method comprises receiving a data packet and N (wherein N is an integer and N>1) filters, each filter comprising a bit mask and corresponding bit values. The method further comprises, for each of the N filters, identifying a key element from a portion of the filter corresponding to a combined filter, the key element being a segment of the filter portion having the richest bit pattern. The method further comprises generating the combined filter by combining the key element of the N filters. The method further comprises filtering the data packet with the combined filter to determine whether there is a match between the data packet and each key element.

Another aspect relates to a computer-readable medium having stored therein a program which, when executed, performs a method of filtering a data packet. The method comprises receiving a data packet and N (wherein N is an integer and N>1) filters, each filter comprising a bit mask and corresponding bit values. The method further comprises, for each of the N filters, identifying a key element from a portion of the filter corresponding to a combined filter, the key element being a segment of the filter portion having the richest bit pattern. The method further comprises generating the combined filter by combining the key element of the N filters. The method further comprises filtering the data packet with the combined filter to determine whether there is a match between the data packet and each key element.

Another aspect relates to a system for filtering a data packet. The system comprises a storage module configured to store a data packet and N (wherein N is an integer and N>1) filters, each filter comprising a bit mask and corresponding bit values. The system further comprises a combined filter generation module configured to (a) identify, for each of the N filters, a key element having the richest bit pattern in a portion of the filter corresponding to a combined filter and (b) generate the combined filter by combining the key element of the N filters. The system further comprises a pre-filtering module configured to filter the data packet with the combined filter to determine whether there is a match between the data packet and each key element.

Another aspect relates to a system for filtering a data packet. The system comprises means for receiving a data packet and N (wherein N is an integer and N>1) filters, each filter comprising a bit mask and corresponding bit values. The system further comprises means for identifying, for each of the N filters, a key element from a portion of the filter corresponding to a combined filter, the key element being a segment of the filter portion having the richest bit pattern. The system further comprises means for generating the combined filter by combining the key element of the N filters. The system further comprises means for filtering the data packet with the combined filter to determine whether there is a match between the data packet and each key element.

BRIEF DESCRIPTION OF THE DRAWINGS

FIG. 5 is a diagram illustrating the resulted combined filter before resolving the location conflicts.

FIG. 6 is a diagram illustrating the combined filter after resolving the location conflicts.

DETAILED DESCRIPTION OF CERTAIN INVENTIVE EMBODIMENTS

Figure 1:
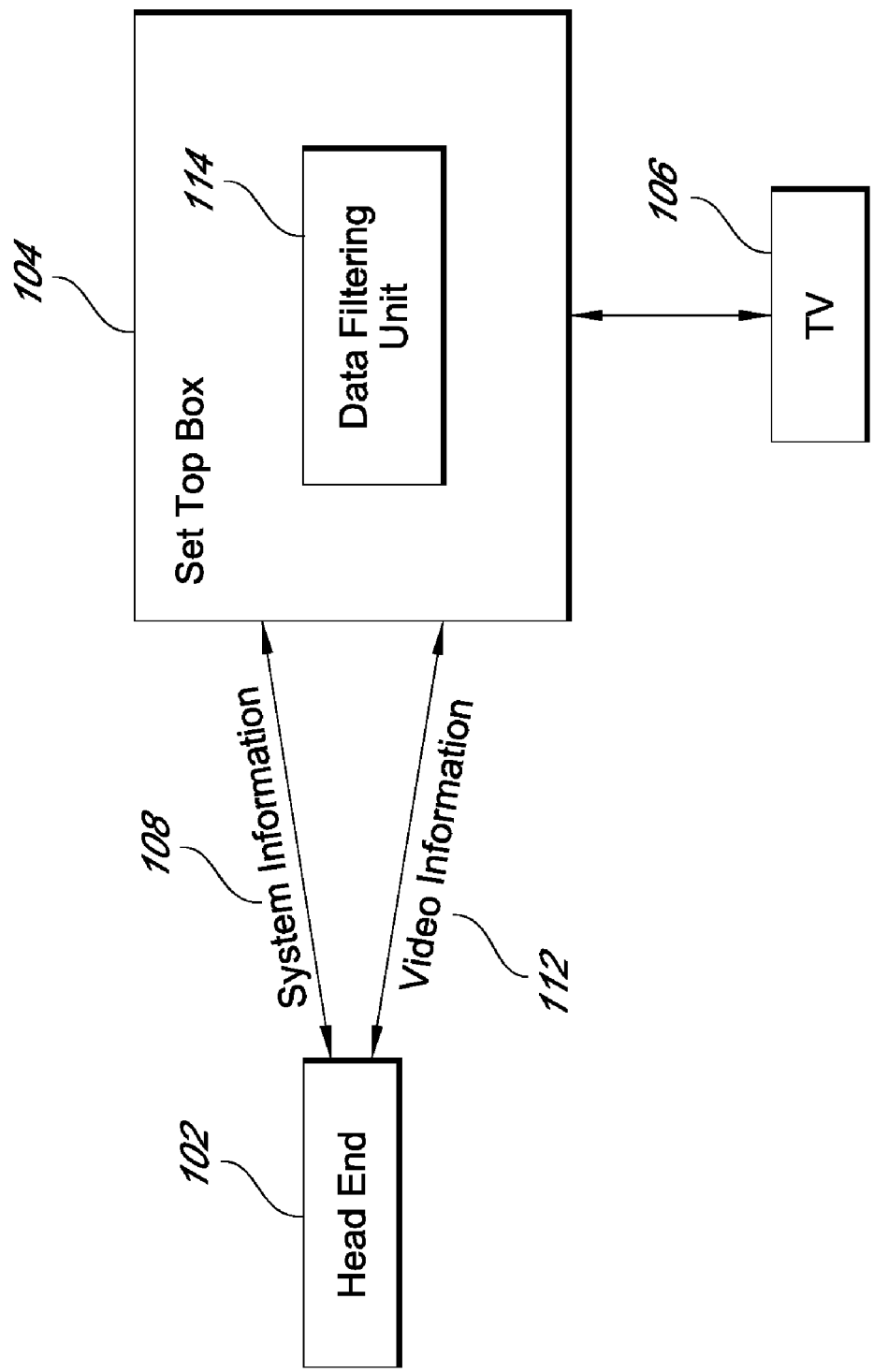
FIG. 1 is a diagram illustrating an exemplary cable television system.

Various aspects and features of the invention will become more fully apparent from the following description and appended claims taken in conjunction with the foregoing drawings. In the drawings, like reference numerals indicate identical or functionally similar elements. In the following description, specific details are given to provide a thorough understanding of the disclosed methods and apparatus. However, it will be understood by one of ordinary skill in the technology that the disclosed systems and methods may be practiced without these specific details. For example, electrical components may be shown in block diagrams in order not to obscure certain aspects in unnecessary detail. In other instances, such components, other structures and techniques may be shown in detail to further explain certain aspects.

It is also noted that certain aspects may be described as a process, which is depicted as a flowchart, a flow diagram, a structure diagram, or a block diagram. Although a flowchart may describe the operations as a sequential process, many of the operations may be performed in parallel or concurrently and the process may be repeated. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Certain embodiments relate to a method and system for filtering a data packet with a group of filters to find a matched filter. In one embodiment, a combined filter is created based on the group of filters to filter out unqualified candidates prior to performing a full filtering, thereby reducing computational complexity of the filtering scheme. Though the method is illustrated in an exemplary context of a set top box, the method is equally applicable to data filtering for other applications.

FIG. 1 is a diagram illustrating an exemplary cable television system. The cable service provider 102 (e.g., a cable head end) sends video information 112 and system information 108 to a set top box (STB) 104. The set top box 104 processes the received information and provides video signals to the television 106 for rendering. In one embodiment, the STB 104 may be embedded into the television 106.

The system information 108 may include a large amount of data packets conveying audio/programming information. The system information 108 may be provided from the cable head end 102 via a DOCSIS Ste-top Gateway (DSG) tunnel (not shown). A data filtering unit 114 inside the set top box 104 processes each data packet to find the data patterns matching the data packet for further processing. The data filtering unit 114 may be located in a decoder module within the STB 104. Different data patterns are provided by the headend 102 with multiple filters, and these patterns may be changed or adjusted by the headend 102. This makes it difficult to apply existing data filtering algorithms which use fixed data pattern for filtering.

Figure 2A:
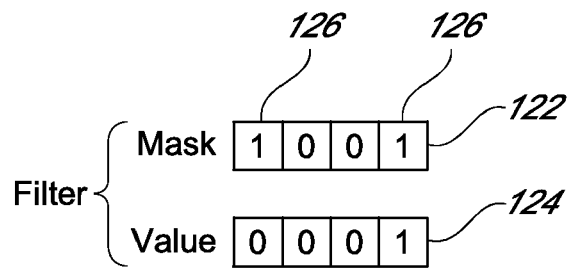
FIGS. 2A-2C are diagrams illustrating an exemplary flow of filtering a packet.
Figure 2B:
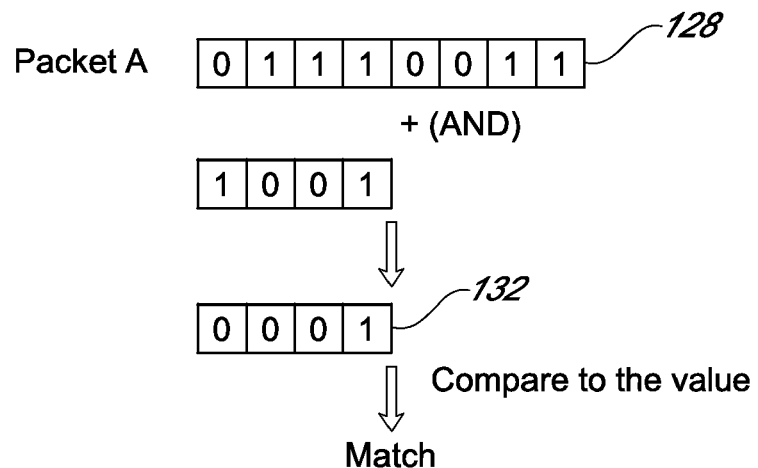

FIGS. 2A and 2B are diagrams illustrating an exemplary flow of filtering a packet. As shown in FIG. 2A, a filter comprises a mask 122 typically having one or more bits 126. Each bit may have the value of either 0 or 1. There is also a value 124 having the same number of bits as the mask 122. There is one bit in the value corresponding to each bit of the mask 122.

Figure 2C:
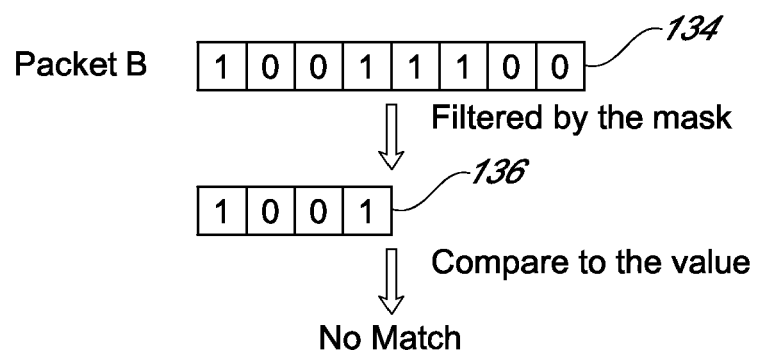

FIG. 2B illustrates how to determine whether there is a match between a data packet and a filter. The packet A 128 is first filtered by the mask 122 by performing an AND operation between each bit of the mask 122 and the corresponding bit in the packet 128. Since the exemplary mask 122 starts from the leftmost bit in a packet, the first bit of the mask 122 is aligned with the first bit of the packet. The resulting packet 132 is then compared to the value 124. If every bit of the filtered packet 132 has the same value as the corresponding bit in the value 124, it is concluded that there is a match between the packet and the filter. In this example, a match is found between the packet 128 and the filter. In another example shown in FIG. 2C, since the first bit of the filtered packet 136 has a different value from the corresponding bit in the value 124, it is concluded that there is no match between the packet 134 and the filter.

In this example, the filter starts from the leftmost bit in a packet. However, the filter can be configured to start from any location in a packet. In another example, the filter is set to start from the $9^{th}$ bit in a packet. In that case, when the data packet is filtered by the filter mask, the first bit of the filter mask is first aligned with the $9^{th}$ bit in the packet. The AND operation is then performed between a bit of the filter mask and a corresponding bit in the packet aligning with the bit of the filter mask.

Figure 3:
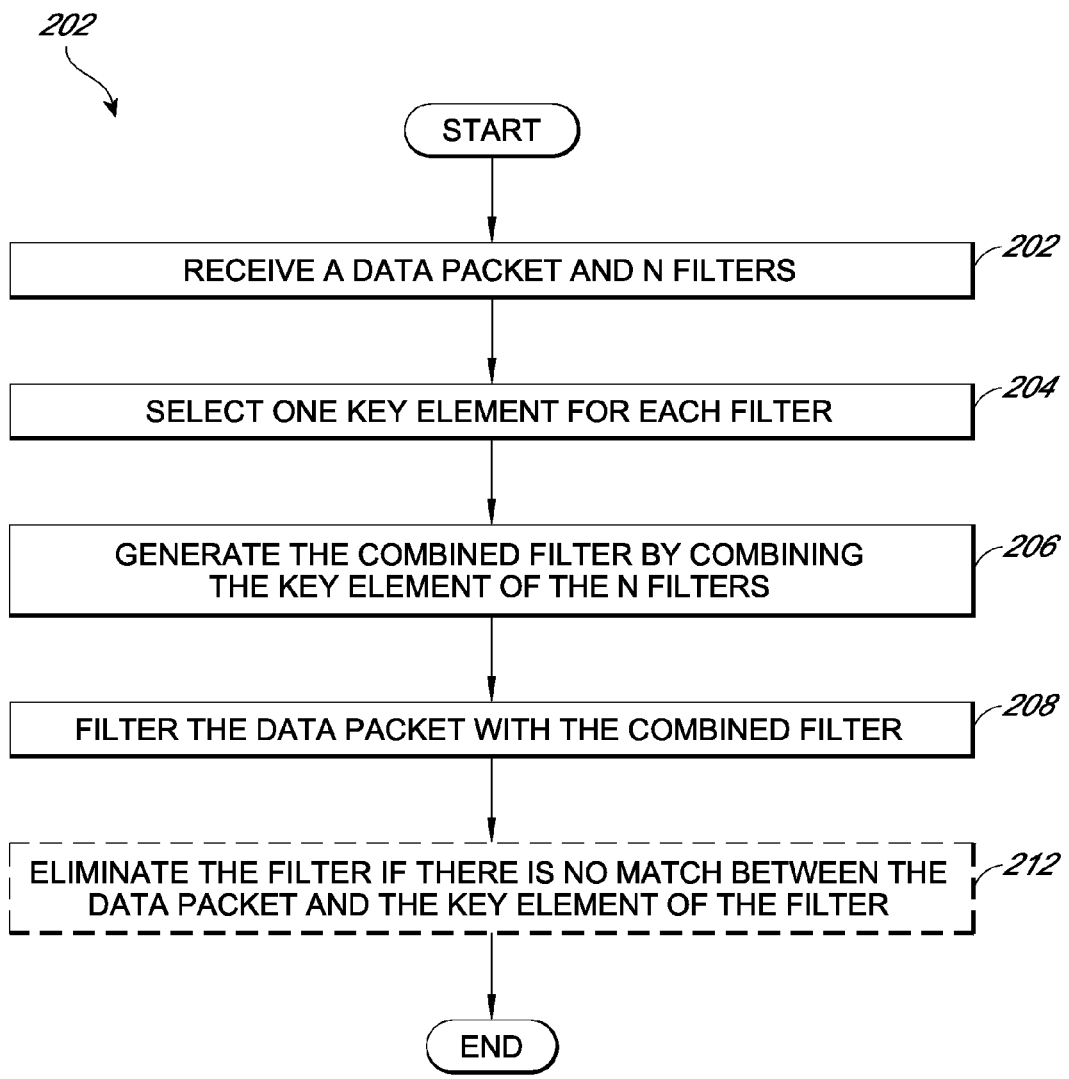
FIG. 3 is a flowchart illustrating one embodiment of an improved scheme for data filtering using multiple filters.

FIG. 3 is a flowchart illustrating one embodiment of an improved scheme for data filtering using multiple filters. Depending on the embodiment, certain steps of the method may be removed, merged together, or rearranged in order.

The exemplary embodiment identifies and uses a key element in a filter mask for each filter for efficient filtering. The key element refers to the richest bit pattern of a filter, i.e., the bit pattern which has the most discriminating power to decide the possibility of a match. The key elements from each mask are integrated into a combined mask for pre-filtering data packets. Unmatched filters determined in the pre-filtering are eliminated from full filtering to save computational complexity. In one embodiment, the size of the key element is selected to be very small in comparison to each filters.

The method 200 starts at block 202, wherein a data packet and N filters are received (N is an integer and N>1) to determine whether any of the N filters matches the data packet.

Next at a block 206, one key element is selected for each of the N filters. The key element is selected from a portion of the filter corresponding to a combined filter. The key element is a segment having the richest bit pattern in the filter portion.

In one embodiment, this process includes determining the length and location of a combined filter. The combined filter may start from any location in a packet. The combined filter may be of any reasonable length. It may be computationally efficient if the length of the combined filter is the multiple of a natural computer Word (e.g., 4 bytes). Typically, the combined filter starts from a byte location. Also, it may be computationally efficient if the combined filter starts at a natural Word (e.g., 4-byte) boundary. In one embodiment, the combined filter are composed of two or more segments. Each segment has the same number of bits.

In one embodiment, this process includes identifying for each filter, a group of bits in the filter mask corresponding to a different segment of the combined filter. The group of bits has the highest discriminating power among all the groups is selected as the key element of the filter.

In one embodiment, the discriminating power is measured by the number of 1's in a group of bits. Therefore, the group that has the largest number of 1's is considered the key element of the filter. Other criteria for selecting key elements may as well be applied.

In one embodiment, if all groups have a number of 1's under a threshold number, then no key element is selected for that filter. Since no element from this filter is integrated to the combined filter, complete filtering is needed for this filter. The threshold number may be, e.g., 1, 2, 3, or other value depending on the application.

Moving to a block 206, a combined filter is generated by combining the key element of the N filters. In one embodiment, the mask and value of the combined filter is first set to all 0s. The mask of key element for each filter is then used to replace the bits in the mask of the combined filter at the corresponding location. The value of key element for each filter is then used to replace the bits in the value of the combined filter at the corresponding location. The replacement may be done by performing a bitwise OP operation between the key element and the corresponding portion of the combined filter.

If there are two (or more) key elements at the same location, the key elements are first combined before merging to the combined filter. A merged mask is generated by having a bitwise AND operation between the key elements. The merged mask is then used to replace the bits in the mask of the combined filter at the corresponding location. The value of each of the key elements is adjusted by performing a bitwise AND operation between the original value and the merged mask. The adjusted value of the two key elements are both merged into the value of the combined filter as alternatives for a possible match. In other words, the value of the combined filter includes two sets of values as alternatives for match at this location.

Next at a block 208, the data packet is filtered with the combined filter to determine whether there is a match between the data packet and the key elements included in the combined filter. In the exemplary embodiment, the data packet is first filtered with the mask of the combined filter. The filtered data packet is then compared to the value of the combined filter to determine whether the filtered data packet includes the same bits as the value of a key element at the corresponding location. For the location where there are two sets of values to match, the filtered data packet is compared to each set in turn to determine whether there is a match.

Last at an optional block 212, a filter is eliminated from further filtering if the pre-filtering in block 208 finds no match between the data packet and a key element of the filter. The filters not eliminated are then used to determine whether there is a match between the data packet and each of these filters.

Figure 4:
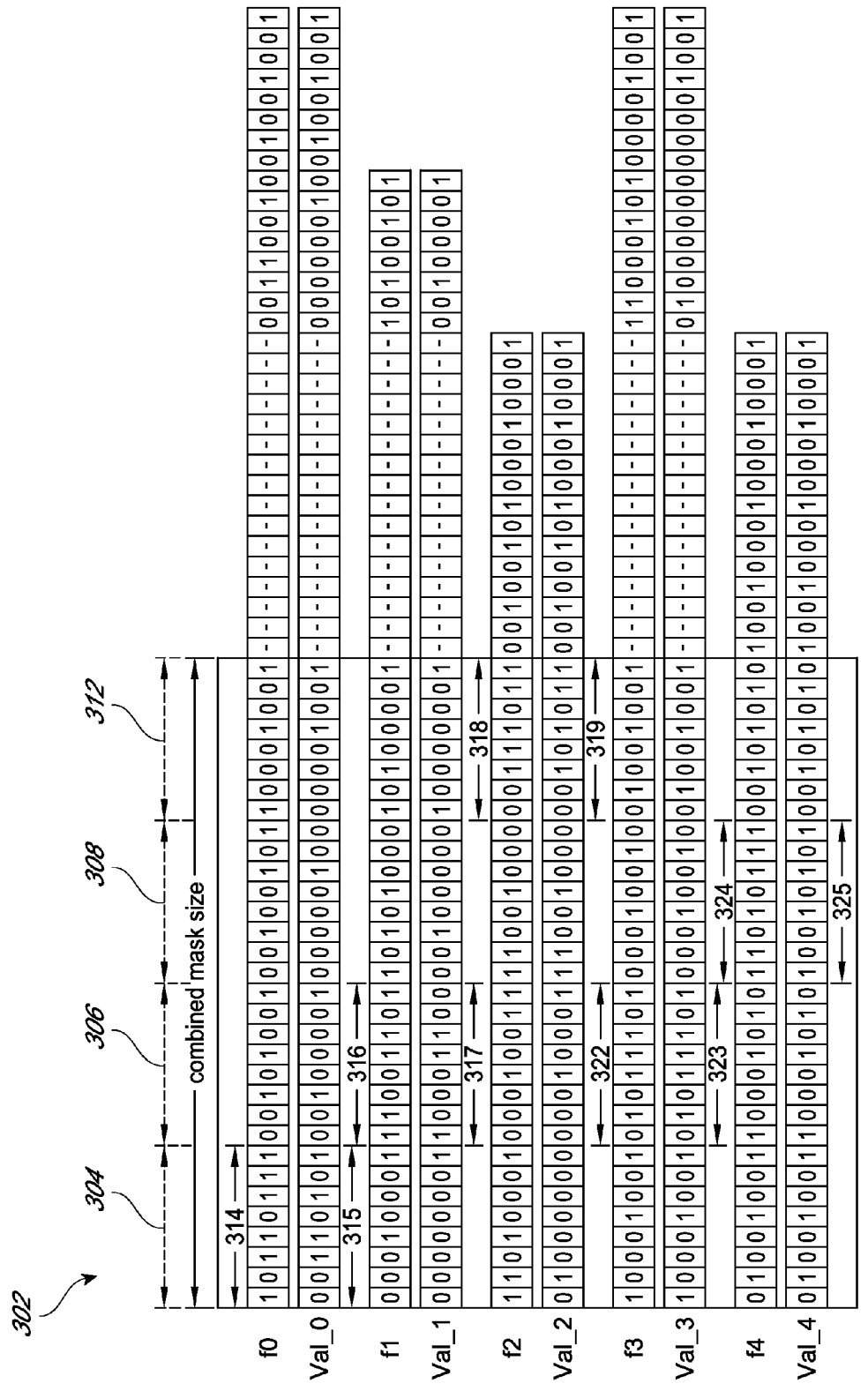
FIG. 4 is a diagram illustrating an exemplary filter set to be applied to a data packet in a set top box.

FIGS. 4-6 are diagrams illustrating an example in which the method of FIG. 3 is applied for data filtering. Though the example is illustrated in an exemplary context of a set top box, the method is equally applicable to data filtering for other applications.

FIG. 4 illustrate an exemplary filter set to be applied to a data packet in a set top box. The filter set includes 5 filters, each having a mask and a value. For example, the first filter has a mask $f_0$ and the value Val_0. The mask and value of the same filter has the same number of bits. The 5 filters are of different sizes. A data packet is considered a valid data, and is sent for further processing, if the data packet is matched to one of the mask and value.

In the example, a combined filter is formed by integrating the elements from each of the filters as follows. The combined filter 302, as shown in FIG. 4, is chosen to have 4 bytes and starts from the first bit in the packet. The combined filter 302 are divided into four segments 304, 306, 308, 312. Each segment is one byte long.

Next a key element is selected from each filters. For the first filter $f_0$, the first, second, third, and fourth byte in the filter mask are identified as corresponding to the segments 304, 306, 308, and 312 respectively. The first bye 314 is selected as the key element since it has the largest number of 1's (i.e. 6) among the identified bytes. Similarly, the second byte 316 of the second filter $f_1$, the fourth byte 318 of the third filter $f_2$, the second byte 322 of the fourth filter $f_1$, and the third byte 324 of the fifth filter $f_4$ are selected as the key elements. Thus, there are two key elements for the segment 306. The first key element has the byte 316 as the mask and the byte 317 as the value. The second key element has the byte 322 as the mask and the byte 323 as the value.

The key elements are then merged into a combined filter. FIG. 5 illustrates the resulted combined filter before resolving the location conflicts. As shown in FIG. 5, the combined filter is generated by simply inserting each key element into the corresponding location in the combined filter. Particularly, the mask for the combined filter is generated by simply inserting the mask of each key element into the corresponding location in the mask of the combined filter. The value for the combined filter is generated by simply inserting the value of each key element into the corresponding location in the value of the combined filter.

As shown in FIG. 5, the byte 342 in the combined filter mask corresponds to the key element 314 in FIG. 4. The byte 348 and 352 in the combined filter mask corresponds to the key element 324 and 318 respectively. The second byte in the combined filter mask has two sets of bits 344 and 346 corresponding to the byte 316 and 322 in FIG. 4 respectively. The second byte in the combined filter value also has two sets of bits 345 and 347 corresponding to the byte 317 and 323 in FIG. 4 respectively.

The combined filter generated in FIG. 5 is then processed to resolve the location conflicts. FIG. 6 illustrates the combined filter after resolving the location conflicts. The key elements 344 and 346 in the mask are merged into a new mask 362 by having a bitwise AND operation between the key elements 344 and 346. The value of each of the key elements, i.e., 345 and 347, is adjusted by performing a bitwise AND operation between the original value and the merged mask 362, resulting in the adjusted value 364 and 366 as shown in FIG. 6. Thus, the value of the combined filter includes two sets of values, i.e., the byte 364 and 366, as alternatives for possible match at this location.

As the combined filter shown in FIG. 6 is available, a pre-filtering process with the combined filter is used to reduce the amount of processing by eliminating un-matched filters. The first 4 bytes of a data packet is first filtered by the combined mask. The result is compared to the value of the combined filter.

If the first byte of the result does not match the first byte of the value of the combined filter, which is a key element of the filter f0, then the packet cannot match the filter f0. The filter f0 is eliminated and is not examined for full length filtering. A similar process is performed for other filters f1, f3, f4, and f2.

Further, since the second byte of the combined filter value has two possible values, i.e., the byte 364 and 366, the result is compared to the byte 364 and 366 respectively. If the result does not match the byte 364, which is a key element of the filter f1, then the filter f1 is eliminated and is not examined for full length filtering. If the result does not match the byte 366, which is a key element of the filter f3, then the filter f3 is eliminated and is not examined for full length filtering. Since the byte 364 and 366 have different match value for the same byte, it is only possible for the packet to match either f1 or f3 but not both.

Next, the data packet is filtered with the remaining filters by full length filtering to determine whether there is a match between the data packet and each filter. For example, if filters f1, f2, and f4 are eliminated from the candidate list in the pre-filtering process, the remaining filters are f0 and f3. A full length filtering is performed with filters f0 and f3 to determine whether any of them matches the data packet.

Figure 7:
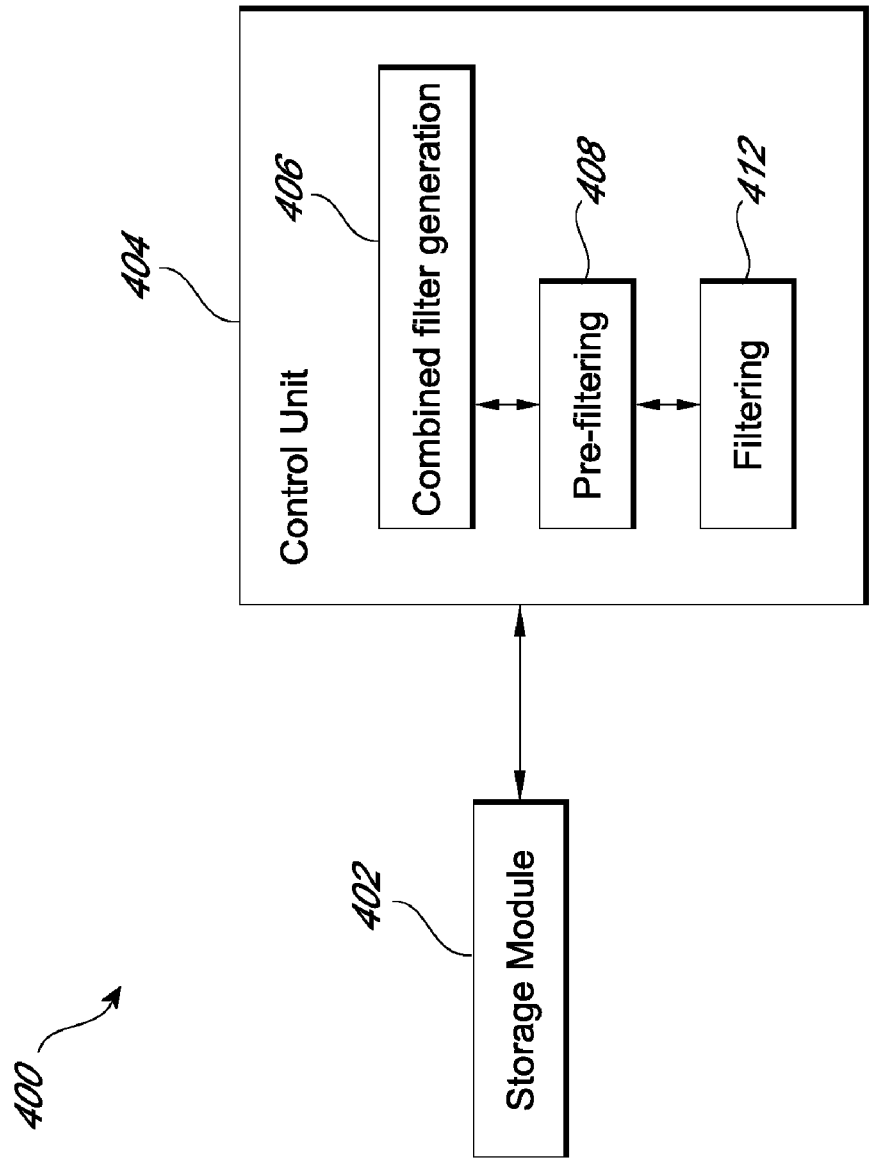
FIG. 7 is a functional block diagram of one embodiment of a system for data filtering using multiple filters.

FIG. 7 is a functional block diagram of one embodiment of a system for data filtering using multiple filters. The system 400 comprises a storage module 402 for storing various data.

The storage module 402 may store, e.g., incoming data packets for processing and the N filters to be used for data filtering. In one embodiment, the storage module 402 may also store a program which, when executed on a processor or a computer, performs a method as described above in FIG. 3. The storage module 402 may be any computer-readable medium or any device suitable for data storage, e.g., a memory capable of storing firmware.

The system 400 comprises a control unit 404 which controls the operation of the system 400. The control unit 404 may be implemented in hardware, firmware, software, or any combination thereof. In one embodiment, the control unit 404 is a processor which may be any suitable general purpose single- or multi-chip microprocessor, or any suitable special purpose microprocessor such as a digital signal processor, microcontroller, or a programmable gate array. As is conventional, the processor may be configured to execute one or more software applications. In certain embodiments, the control unit 404 runs a software application to perform a method for data filtering using multiple filters such as the method described above in FIG. 3.

In the exemplary embodiment, the control unit further comprises a combined filter generation module 406, a pre-filtering module 408, and a full length filtering module 412. The combined filter generation module 406 generates a combined filter based on the N filters. In one embodiment, the combined filter generation module 406 is configured to (a) identify, for each of the N filters, a key element having the richest bit pattern in a portion of the filter corresponding to a combined filter and (b) generate the combined filter by combining the key element of the N filters.

In one embodiment, the combined filter comprises at least two segments of the same length. The combined filter generation module identifies a key element by selecting a portion of the filter as a key element, the portion of the filter having the richest bit pattern among portions of the filter, wherein each portion of the filter corresponds to a different segment of the combined filter.

The pre-filtering module 408 filters the data packet with the combined filter to eliminate certain filters from the candidate list for a possible match with the data packet. A filter is eliminated if there is no mach between the data packet and a key element in the combined filter which corresponds to the filter. The full length filtering module 412 performs a full length filtering on the data packet using those filters not eliminated by the pre-filtering module 408, in order to determine whether any filter matches the data packet.

In the foregoing embodiments, a key element is selected from each filter and then integrated into a combined mask for pre-filtering data packets. Unmatched filters in the pre-filtering are eliminated from full filtering. The key element is selected to have a small size in comparison to the filters. These embodiments reduce computational complexity of the data filtering substantially, as it will be further discussed below. These embodiments work particularly well when pattern of these filters are arbitrary or when the incoming packets hit different filters evenly. This is because a substantial number of filters are eliminated during pre-filtering.

The foregoing embodiments do not require any prior knowledge of the filters, nor do they depend on fixed mask patterns. This makes them suitable for applications that do not have prior knowledge of the filters and incoming packets, e.g., the set top box.

Exemplary Running Time Comparison

The exemplary running time analysis shows that the embodiments as described above are more efficient than the traditional full length filtering. The running time of an algorithm on a particular input can be expressed as a function $O(a)$, wherein a indicates the number of primitive operations or steps executed. The following notation is used for this analysis:

k: Number of filters n: Number of bits in a filter (For simplicity, we will assume that every filter contains the same number of bits.)

d': Discriminating power for combined filter method (i.e. number of 1's in a key element of a combined filter)

r: Number of key elements in a combined filter w: Number of bits in a word c: Number of words in a filter ($=n/w$)

c": Number of words in a key element. As discussed above, the value of c" is chosen to be small.

s: Number of matched filters after the pre-engine filtering

The worst case running time for the traditional method can be measured as $O(n/w \cdot k) = O(c \cdot k)$. Performance of the traditional method may become a quadratic function of k, as c (i.e. $n/w$) approaches the number of filters k, that is, $O(k^2)$ if c is of a value close to k.

In comparison, the embodiments using a combined mask has its worse case running time calculated as follows:

$$\text{Worst case running time} = O((d' \cdot r)/w) + O(s \cdot (n-d')/w) \text{ i.e.,}$$

$$O(\text{pre-engine}) +$$

$$O(\text{full filtering after pre-engine filtering})$$

$$= O(r \cdot c'') + O(s \cdot (n/w - c'')), \text{ wherein } c'' - d'/w$$

$$= O(r \cdot c'') + O(s \cdot n/w - s \cdot c'')$$

$$= O(r \cdot c'') + O(s \cdot n/w), \text{ if } c''$$

$$\approx 0$$

$$= O(s \cdot n/w), \text{ if } c = n/w \gg c''$$

$$= O(c \cdot s)(\text{since } s = n/w)$$

$c \gg c''$ is met since the size of the key element is really small in comparison to the filters in these embodiments. Therefore, these embodiments using the combined filter is more efficient than the traditional method, i.e., $O(c \cdot s) < O(c \cdot k)$ (as $s < k$).

Various embodiments of a method are described above, including, e.g., a method for data filtering with multiple filters as described in FIG. 3. In one embodiment, a software program may be stored in a computer-readable medium. The software program, when being executed by a computer, performs the method.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. A method of filtering a data packet, comprising:
receiving a data packet and N (wherein N is an integer and N>1) filters, each filter comprising a bit mask and corresponding bit values;
for each of the N filters, identifying a key element from a portion of the filter corresponding to a combined filter, the key element being a segment of the filter portion having the highest number of one's and wherein the combined filter has at least two segments of the same length;
generating the combined filter by combining the key element of the N filters; and
filtering the data packet with the combined filter to determine whether there is a match between the data packet and each key element.

2. The method of claim 1, wherein the combined filter is of a length smaller than each of the N filters.

3. The method of claim 1, wherein the bit mask of each filter of the N filters comprising a total number of bits equal to a total number of corresponding bit values of the filter, wherein the bit mask is used to generate filtered data packet by performing an AND operation between the bit mask of the filter and the data packet, wherein a match is found between a filter and a data packet if each bit of the value matches a corresponding bit of the filtered data packet.

4. The method of claim 1, further comprising eliminating a filter of the N filters if there is no match between the data packet and the key element of the filter.

5. The method of claim 4, further comprising filtering the data packet with the combined filter, generated by key elements of each of the N filters not eliminated to determine whether there is a match.

6. The method of claim 1, wherein the combined filter comprises a number of bytes.

7. The method of claim 1, wherein the combined filter is located at a natural Word boundary.

8. The method of claim 1, wherein identifying a key element for each filter of the N filters comprises selecting a portion of the filter as a key element, the portion of the filter having the highest number of one's among portions of the filter, wherein each portion of the filter corresponds to a different segment of the combined filter.

9. The method of claim 8, wherein no key element is selected from a filter of the N filters if the selected portion of the filter mask corresponding to the combined filter has less than a threshold number of 1's.

10. The method of claim 9, wherein the threshold number is 1, 2, or 3.

11. The method of claim 8, wherein the generating of the combined filter further comprising:
setting each bit of the combined filter to be 0; and
replacing each segment of the combined filter with key elements of the filter of the N filters at a same bit position of the bit mask.

12. The method of claim 11, wherein the replacing of each segment of the combined filter further comprises:
if there are a first and a second key element at the same position of the bit mask,
performing a bitwise AND operation between the bit mask of the first and second key elements to generate one merged key element mask and replacing the corresponding segment of the combined filter mask with the merged key element mask;
for each of the first and second key element, generating an adjusted value by performing a bitwise AND operation between the value of the key element and the merged key element mask; and
keeping the adjusted value for the first and second key elements as alternatives for match.

13. The method of claim 12, wherein the filtering of the data packet with the combined filter to determine whether there is a match between the data packet and each key element further comprising:
generating filtered data packet by performing an AND operation between the merged key element mask and the data packet; and
comparing the filtered data packet to the adjusted value for the first and second key element to determine whether there is a match between the filtered data packet and each of the first and second key element.

14. The method of claim 8, wherein each segment of the combined filter comprises one or more bytes.

15. A tangible and non-transitory computer-readable medium having stored therein a program which, when executed, performs a method of filtering a data packet, the method comprising:
receiving a data packet and N (wherein N is an integer and N>1) filters, each
filter comprising a bit mask and corresponding bit values;
for each of the N filters, identifying a key element from a portion of the filter corresponding to a combined filter, the key element being a segment of the filter portion having the highest number of one's and wherein the combined filter has at least two segments of the same length;
generating the combined filter by combining the key element of the N filters; and
filtering the data packet with the combined filter to determine whether there is a match between the data packet and each key element.

16. A system for filtering a data packet, comprising:
a storage module configured to store a data packet and N (wherein N is an integer and N>1) filters, each filter comprising a bit mask and corresponding bit values;
a combined filter generation module configured to (a) identify, for each of the N filters, a key element having the highest number of one's in a portion of the filter corresponding to a combined filter and wherein the combined filter has at least two segments of the same length and (b) generate the combined filter by combining the key element of the N filters; and
a pre-filtering module configured to filter the data packet with the combined filter to determine whether there is a match between the data packet and each key element.

17. The system of claim 16, wherein the combined filter is of a length smaller than each of the N filters.

18. The system of claim 16, wherein the pre-filtering module eliminates a filter of the N filters if there is no match between the data packet and the key element of the filter, wherein the system further comprising a filtering module configured to filter the data packet with the combined filter, generated by key elements of each of the N filters not eliminated to determine whether there is a match.

19. The system of claim 16, wherein the data packet is received from a cable head end.

20. The system of claim 16, wherein the combined filter generation module identifies a key element by selecting a portion of the filter of the N filters as a key element, the portion of the filter having the highest number of one's among portions of the filter, wherein each portion of the filter corresponds to a different segment of the combined filter.

21. The system of claim 16, wherein no key element is selected from a filter of the N filters if the selected portion of the filter's bit mask corresponding to the combined filter has less than a threshold number of 1's.

22. A system for filtering a data packet, comprising:

means for receiving a data packet and N (wherein N is an integer and N>1) filters, each filter comprising a bit mask and corresponding bit values;

means for identifying, for each of the N filters, a key element from a portion of the filter corresponding to a combined filter, the key element being a segment of the filter portion having the highest number of one's and wherein the combined filter has at least two segments of the same length;

means for generating the combined filter by combining the key element of the N filters; and means for filtering the data packet with the combined filter to determine whether there is a match between the data packet and each key element.

* * * * *